US007230689B2

(12) United States Patent
Lau

(10) Patent No.: US 7,230,689 B2
(45) Date of Patent: Jun. 12, 2007

(54) MULTI-DIMENSIONAL MEASURING SYSTEM

(76) Inventor: Kam C. Lau, 12700 Greenbrier Rd., Potomac, MD (US) 20854

( * ) Notice: Subject to any disclaimer, the term of this patent is extended or adjusted under 35 U.S.C. 154(b) by 332 days.

(21) Appl. No.: 10/646,745

(22) Filed: Aug. 25, 2003

(65) Prior Publication Data

US 2004/0200947 A1    Oct. 14, 2004

Related U.S. Application Data

(60) Provisional application No. 60/405,712, filed on Aug. 26, 2002.

(51) Int. Cl.
*G01N 21/00* (2006.01)
(52) U.S. Cl. .......................................... 356/73
(58) Field of Classification Search .................. None
See application file for complete search history.

(56) References Cited

U.S. PATENT DOCUMENTS

| 4,060,809 A | 11/1977 | Baghdady |
| 4,714,339 A | 12/1987 | Lau et al. |
| 5,212,738 A | 5/1993 | Chande et al. |
| 5,229,828 A * | 7/1993 | Wiklund ................. 356/4.01 |
| 5,974,348 A | 10/1999 | Rocks |
| 5,979,070 A | 11/1999 | Lau |
| 6,049,377 A | 4/2000 | Lau et al. |
| 6,269,284 B1 | 7/2001 | Lau et al. |
| 6,392,222 B1 | 5/2002 | Greenwood |
| 6,667,798 B1 | 12/2003 | Markendorf et al. |

FOREIGN PATENT DOCUMENTS

WO    WO2004/019459    4/2004

* cited by examiner

*Primary Examiner*—Tu T. Nguyen
(74) *Attorney, Agent, or Firm*—Pillsbury Winthrop Shaw Pittman, LLP

(57) ABSTRACT

A laser based tracking unit communicates with a target to obtain position information about the target. Specifically, the target is placed at the point to be measured. The pitch, yaw and roll movements of the target, and the spherical coordinates of the target relative to the tracking unit are then obtained. The target can be, for example, an active device incorporated into a moveable device such as a remote controlled robot.

18 Claims, 14 Drawing Sheets

MULTI-DIMENSIONAL MEASURING SYSTEM

This application claims the benefit of U.S. Provisional Application No. 60/405,712 filed Aug. 26, 2002, which is incorporated herein by reference in its entirety.

BACKGROUND

1. Field of the Invention

The present invention relates generally to a measuring system. In particular, the systems and methods of this invention are directed toward a multi-dimensional laser tracking system.

2. Background of the Invention

Precision measuring systems have a wide variety of applications. For example, in robotics, accurate positioning and orientation of a robot is often required. To achieve a high degree of precision, a robot position measuring system can be used. Such a system typically uses a laser beam interferometer to determine the position and/or orientation of an end-effector of the robot. Such system can monitor the position and orientation of the robot end-effector in real-time while providing accuracy, speed and measurement data.

For example, a Three and Five Axis Laser Tracking System is discussed in Applicant's U.S. Pat. No. 4,714,339, and a Five-Axis/Six-Axis Laser Measuring System is discussed in Applicant's U.S. Pat. No. 6,049,377, both of which are incorporated herein by reference in their entirety. In addition, Applicant's U.S. Application No. 60/377,596, entitled "Nine Dimensional Laser Tracking System and Method," which was filed on May 6, 2003, is also incorporated herein by reference in its entirety to provide additional description for the present invention.

BRIEF SUMMARY OF THE INVENTION

One aspect of the invention provides multi-dimensional measuring system that includes a tracking unit, a target, a distance determining module, and an output module. The tracking unit emits laser light and performs tracking using spherical coordinates. The target is in communication with the tracking unit. The target is capable of making pitch, yaw, and roll movements. The distance determining module determines a distance between the tracking unit and the target. The output module outputs position information about the target relative to the tracking unit based on the spherical coordinates, the pitch, yaw and roll movements, and the distance.

Preferably, the system further includes an output device that outputs the position information about the target. Preferably, the roll movement is based on at least one of a comparison between a horizontally polarized component of the laser light and a vertically polarized component of the laser light. Preferably, the system further includes a first photodetector that detects the horizontally polarized component of the laser light and a second photodetector that detects the vertically polarized component of the laser light. Preferably, the system further includes a roll determination circuit that receives an output of the first photodetector and an output of the second photodetector. In an alternative embodiment, the system uses an electronic level to measure roll movements of the target.

Preferably, the target is an active target that is capable of moving relative to the tracking unit. Preferably, the target is at least one of incorporated into a remote unit, fixably attached to an object, used for feedback control, used for calibration, used for machine tool control, used for parts assembly, used for structural assembly, and used for dimensional inspection. Preferably, the remote unit is a robot. Preferably, the robot includes a drive system and one or more traction devices that allow the robot to adhere to a surface. Preferably, the traction devices are suction cup type devices. Alternatively, a positive air pressure system can be used to maintain the remote unit movably attached to the surface. Preferably, the system further includes a vacuum system. Preferably, the system further includes one or more accessories that allow a function to be performed based at least on the position information of the target.

Another aspect of the invention provides a remote unit associated with a multi-dimensional measuring system. The remote unit includes a target and probe assembly coupled to the target. The target is in communication with a tracking unit of the multi-dimensional measuring system. The target is capable of making pitch, yaw, and roll movements. The probe assembly includes a probe tip, a probe stem, and a probe base. The probe tip is configured to reach locations that are not in a line of sight between the tracking unit and the target.

Preferably, the remote unit further includes one or more encoders coupled to the probe assembly. Preferably, at least one of the encoders is configured to determine a first angular position of the probe tip relative to the probe base. Preferably, at least one of the encoders is configured to determine a second angular position of the probe tip relative to the probe base. Preferably, at least one of the encoders is configured to determine an axial position of the probe tip relative to the probe base.

Preferably, the remote unit further includes a trigger configured to effect one or more measurements associated with a location touched by the probe tip. Alternatively, the remote unit can include a touch sensor associated with the probe tip. One or more measurements associated with a location is taken when the touch sensor comes into contact with the location.

In another aspect, the invention relates to a target associated with a multi-dimensional measuring system. The target includes a retro-reflector and a laser light sensor. The retro-reflector has an apex. The apex is configured to allow at least part of a laser beam light entering the retro-reflector to exit the retro-reflector. The laser light sensor is configured to detect the at least part of the laser beam light exiting the retro-reflector through the apex. Preferably, the target is configured to be coupled to an optical measuring sensor.

The retro-reflector is preferably a hollow retro-reflector. The retro-reflector includes an aperture at the apex. The aperture is configured to allow the at least part of the laser beam light to exit the retro-reflector. Preferably, the retro-reflector includes three mirrors that form the apex.

The retro-reflector may alternatively be a solid retro-reflector. The apex of the solid retro-reflector includes a small flat surface polished to allow the at least part of the laser beam light to exit the retro-reflector.

The laser light sensor can be a photodetector. Alternatively, the laser light sensor can be a charge coupled device array sensor. Preferably, the laser light sensor is operable to detect at least one of the pitch and yaw movements of the target.

Another aspect of the invention provides a method for measuring a position of an object. Exemplary steps of the method includes: (1) monitoring spherical coordinates of a laser light emitting tracking unit; (2) monitoring pitch, yaw, and roll movements of a target in communication with the tracking unit; (3) determining a distance between the tracking unit and the target; and (4) outputting position information about the target relative to the tracking unit based on the spherical coordinates, the pitch, yaw, and roll movements, and the distance. It is noted that the method does not necessarily have to follow the order described above.

Preferably, the roll movement is based on at least one of a comparison between a horizontally polarized component of a laser light emitted by the tracking unit and a vertically polarized component of the laser light. Preferably, a roll determination circuit performs the comparison between the horizontally polarized component of the laser light and the vertically polarized component of the laser light.

In another aspect, the invention includes a system for measuring the position of an object that includes: (1) means for monitoring spherical coordinates of a laser light emitting tracking unit; (2) means for monitoring pitch, yaw, and roll movements of a target in communication with the tracking unit; (3) means for determining a distance between the tracking unit and the target; and (4) means for outputting position information about the target relative to the tracking unit based on the spherical coordinates, the pitch, yaw, and roll movements, and the distance.

Accordingly, in accordance with an exemplary embodiment of the invention, aspects of the invention relate to a multi-dimensional measuring system.

An additional aspect of the invention relates to determining roll movements of a target based on measurements from a polarized laser.

Additionally, aspects of the invention relate to the design and use of an active target in conjunction with a tracking unit.

Additionally, aspects of the invention relate to the use of target on a remote unit coupled with a trigger or a touch sensor.

Additional aspects of the invention relate to a remotely controlled robot that incorporates active target technology.

Additional aspects of the invention relate to a retro-reflector being used in a target of a multi-dimensional measuring system.

Additional aspects of the invention relate to methods for calibrating a vector of a probe tip.

DETAILED DESCRIPTION OF THE INVENTION

The systems and methods of this invention employ a combination of a tracking unit and a target to accomplish multi-dimensional laser tracking. For example, in a six-dimensional (6-D) system of the invention, the six dimensions are pitch, yaw, and roll movements of a target, and the spherical coordinates, i.e., the 2 angles $\alpha$, $\theta$ and the radial distance, of the target relative to the tracking unit. The target is preferably an active target, which can be held by a person, a robot, or another moving object. By using an active target, target coordinates maintain a relatively perpendicular relation to the incoming beam originated from the tracking unit. Additionally, by employing an absolute distance measurement (ADM) technique, absolute ranging is possible.

In general, the pitch and yaw based measurements can be derived from an encoder present on the target. The roll measurements can be based on, for example, a polarization or an electronic level technique discussed below. The absolute distance measurements or ADM can be accomplished using, for example, repetitive time of flight (RTOF) pulses, a pulsed laser, phase/intensity modulation, or the like. Additional description can be found in Applicant's U.S. Patent Application No. 60/377,596, the entirety of which is incorporated herein by reference.

Specifically, an RTOF based system includes a photodetector, such as a PIN photodetector, a laser amplifier, a laser diode, and a frequency counter. A first laser pulse is fired to the target. Upon detecting the return pulse, the detector triggers the laser amplifier and causes the laser diode to fire a second pulse, with the pulses being detected by the frequency counter. However, it is to be appreciated that the reverse logic also works with equal success. The distance (D) of the target from the tracking unit can then be calculated by:

$$D = \frac{C}{4}\left(\frac{1}{f} - \frac{1}{f_0}\right)$$

such that:

D=0; f=$f_0$ where C is the speed of light, $f_0$ is a reference frequency and f is the frequency of the pulses.

The systems and methods of this invention have various applications. In general, the systems and methods of this invention allow the monitoring of multiple degrees (e.g., six degrees) of freedom of an object. For example, the systems and methods of this invention can be used for structural assembly, real-time alignment and feedback control, machine tool calibration, robotic position control, position tracking, milling machine control, calibration, parts assembly, dimensional inspection or the like.

Additionally, the systems and methods of this invention, using a 6-D tracking system, lend themselves to use in the robotic arts. For example, the 6-D laser tracking system can be incorporated into a robot, that is, for example, capable of scaling various objects such that, for example, precise measurements can be taken of those objects and/or various functions performed at specific locations on the object.

Figure 1:
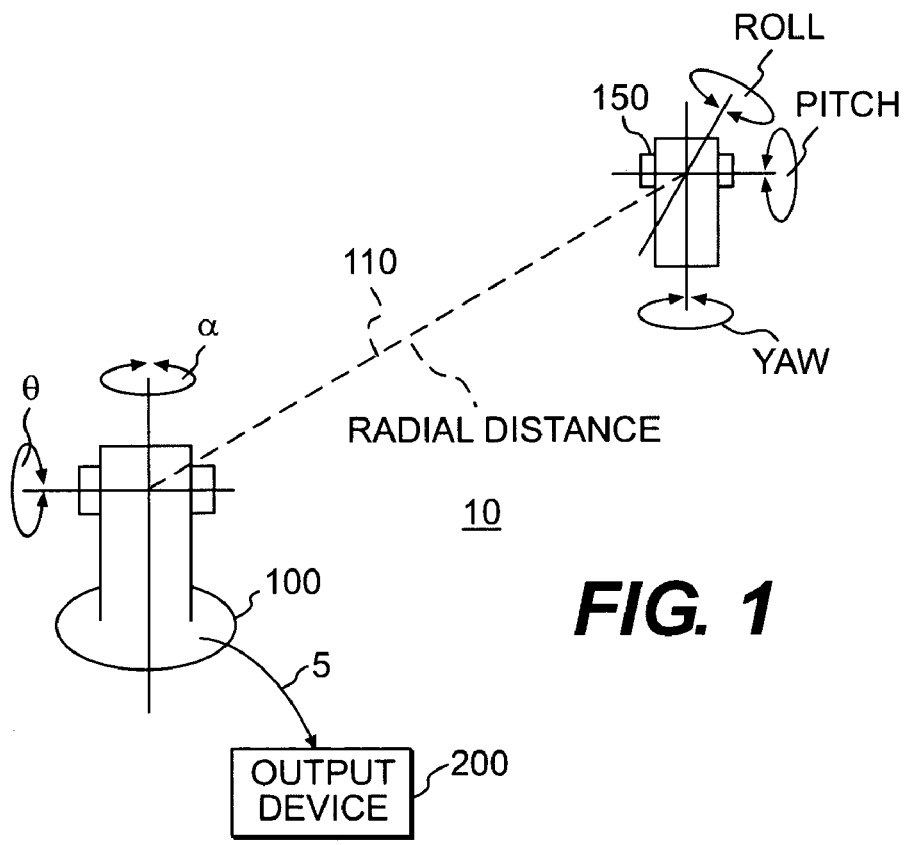
FIG. 1 is a schematic diagram illustrating an exemplary multi-dimensional measuring system of the invention.

FIG. 1 is a schematic diagram illustrating an exemplary multi-dimensional measuring system of the invention. Laser tracking system 10 includes tracking unit 100 and target 150. Tracking unit 100 emits one or more lasers 110 that communicate with target 150 to determine the six dimensional measurements associated with target 150. The six dimensional measurements are output on output device 200. In particular, the six dimensions illustrated in FIG. 1 are pitch, yaw, and roll movements of target 150, the spherical, and once converted Cartesian, coordinates of target 150 relative to tracking unit 100, and the radial distance between target 150 and tracking unit 100.

As discussed in Applicant's previous patents and patent application referenced above, the pitch, yaw, and spherical coordinate measurements can be based on various technologies. The pitch and yaw measurements can be based on, for example, one or more rotary encoders. The distance measurements can be based on, for example, a pulsed laser configuration, an RTOF pulse, phase and/or intensity modulation of the laser beam, or the like. These various systems can provide absolute ranging of target 150. Target 150 is preferably an active target. Specifically, an absolute distance measurement (ADM) technique can be used to determine an approximate initial distance and then an interferometer based technique can be used to refine the initial distance measurement. The ADM technique is desirable because without it, two measurements must be taken and reverse triangulation must be performed to calculate the distance.

Tracking unit 100 and target 150 can be, for example, motorized units that allow one or more portions of tracking unit 100 and target 150 to maintain a perpendicular orientation to incoming laser beam 110 emitted from tracking unit 100. Tracking unit 100 is the laser source. Thus, through a combination of rotary encoders and motors that employ position signals from one or more photodetectors, as discussed hereinafter, target 150 is capable of remaining perpendicular to incoming laser beam 110. For example, through the use of a gimbal type mount and corresponding position motors, such as stepping motors, servo motors and/or encoders, target 150 "tracks" tracking unit 100. Based upon the relationship of target 150 to incoming laser 110, 6-D laser tracking system 10 is able to determine the orientation of target 150. Alternatively, target 150 can be a passive device, for example, a hand-held device such as a corner cube, for which a user would be responsible for maintaining a line of sight between target 150 and tracking unit 100.

Preferably, tracking unit 100 is also capable of being miniaturized by incorporating both the absolute distance measurement and interferometer electronics in, for example, the gimbaled portion of tracking unit 100. This provides various exemplary advantages including reduced weight, reduced size, minimization of external connections, quicker tracking speeds, and the like.

Output device 200, connected to one or more of tracking unit 100 and target 150 via a wired or wireless link 5, outputs position information associated with target 150. For example, output device 200 can be a computer, a feedback input for a position control device, a display, a guidance system, or the like. In general, output device 200 can be any device capable of outputting the position information associated with target 150.

Additionally, one or more lasers 110 can be used to communicate the position information about target 150 back to tracking unit 100. For example, after an initial distance is determined, the laser used for the absolute distance measurement can be used for data communication and the interferometer based laser used for the radial distance measurements. Alternatively, a dedicated laser can be incorporated into system 10 that would allow full time communication between target 150 and tracking unit 100.

Figure 2:
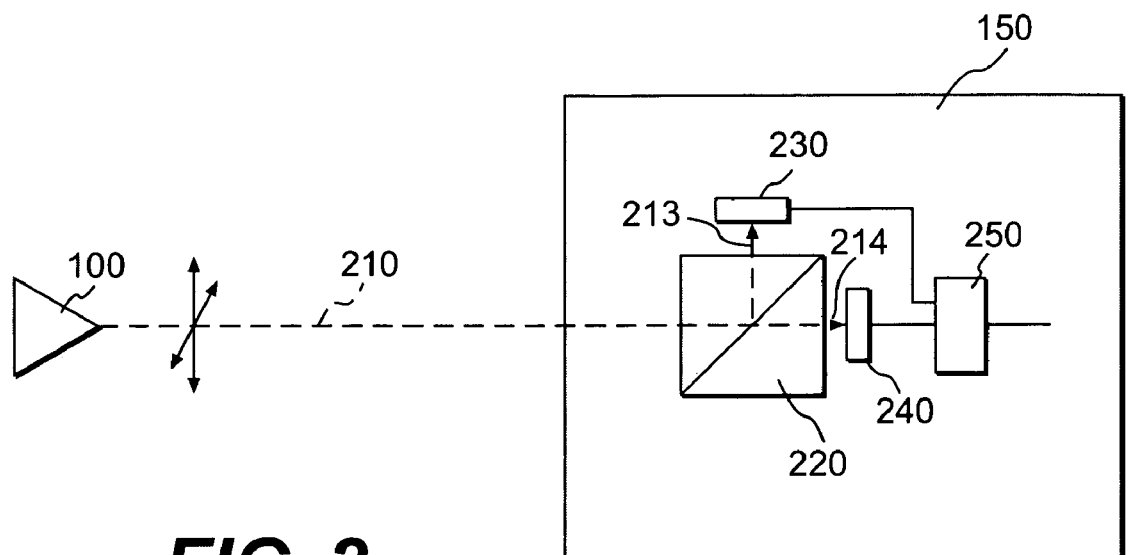
FIG. 2 is a schematic diagram illustrating a roll determination system of the invention.

FIG. 2 is a schematic diagram illustrating a roll determination system of the invention. In particular, the system includes a laser source (not shown) located in tracking unit 100, polarized laser beam 210, polarizing beam splitter 220, first photodetector 230, second photodetector 240, and roll determination circuit 250. Roll determination circuit 250 can be, for example, a differential amplifier. The laser source can be, for example, a laser head. As shown in FIG. 2, polarizing beam splitter 220, first photodetector 230, second photodetector 240, and roll determination circuit 250 are members of target 150.

In operation, tracking unit 100 emits polarized laser beam 210 that is received by polarizing beam splitter 220. Polarizing beam splitter 220 splits incoming beam 210 into two paths. A first path is directed toward first photodetector 230 and a second path of polarized laser beam 210 is directed toward second photodetector 240. When polarized laser beam 210 encounters polarizing beam splitter 220, polarized laser beam 210 is split into horizontally polarized component 214 and vertically polarized component 213 as a result of the properties of beam splitter 220.

Horizontally polarized component 214 of beam 210 passes through polarized beam splitter 220 to photodetector 240 that generates an output signal corresponding to the intensity of horizontally polarized component 214 of beam 210. Similarly, vertically polarized component 213 of beam 210 is directed by beam splitter 220 onto photodetector 230 that also produces a signal corresponding to the intensity of vertically polarized component 213 of beam 210. The intensity measurements of photodetectors 230 and 240 can be connected to, for example, the positive and negative inputs, respectively, of roll determination circuit 250, which provides an output signal representative of the roll between tracking unit 100 and target 150. Preferably, roll determination circuit 250 is a high-gain differential amplifier.

As discussed above, polarized laser beam 210 is split into two different polarized components based on the exact roll orientation between tracking unit 100 and target 150. At a 45° roll orientation, photodetectors 230 and 240 receive the same intensity. However, as target 150 is rolled in either direction, one of the detectors receives a greater intensity of polarized laser beam 210 than the other. The difference between these outputs is measured by, for example, roll determination circuit 250, to provide an indication of the roll. This subtraction operation of roll determination circuit 250 also advantageously compensates for background and extraneous noise, such as that produced by fluctuations in the beam intensity and/or background light.

Specifically, variations in the beam output, as well as other signal noise that may be present, can be measured by both photodetector 230 and photodetector 240. These variations can be negated by the operation of roll determination circuit 250. This, for example, increases the sensitivity and accuracy of the system.

The signal representative of the roll can be output to, for example, a computer (not shown) provided with software that is capable of recording, analyzing or initiating further action based on the roll measurement.

Alternatively, other techniques may be used for roll determination. These techniques include, but are not limited to, electronic levels, such as pendulum based techniques, conductive fluid capillary tube techniques, liquid mercury reflective sensors, or, in general, any technique that allows the roll of the target to be determined.

Figure 3:
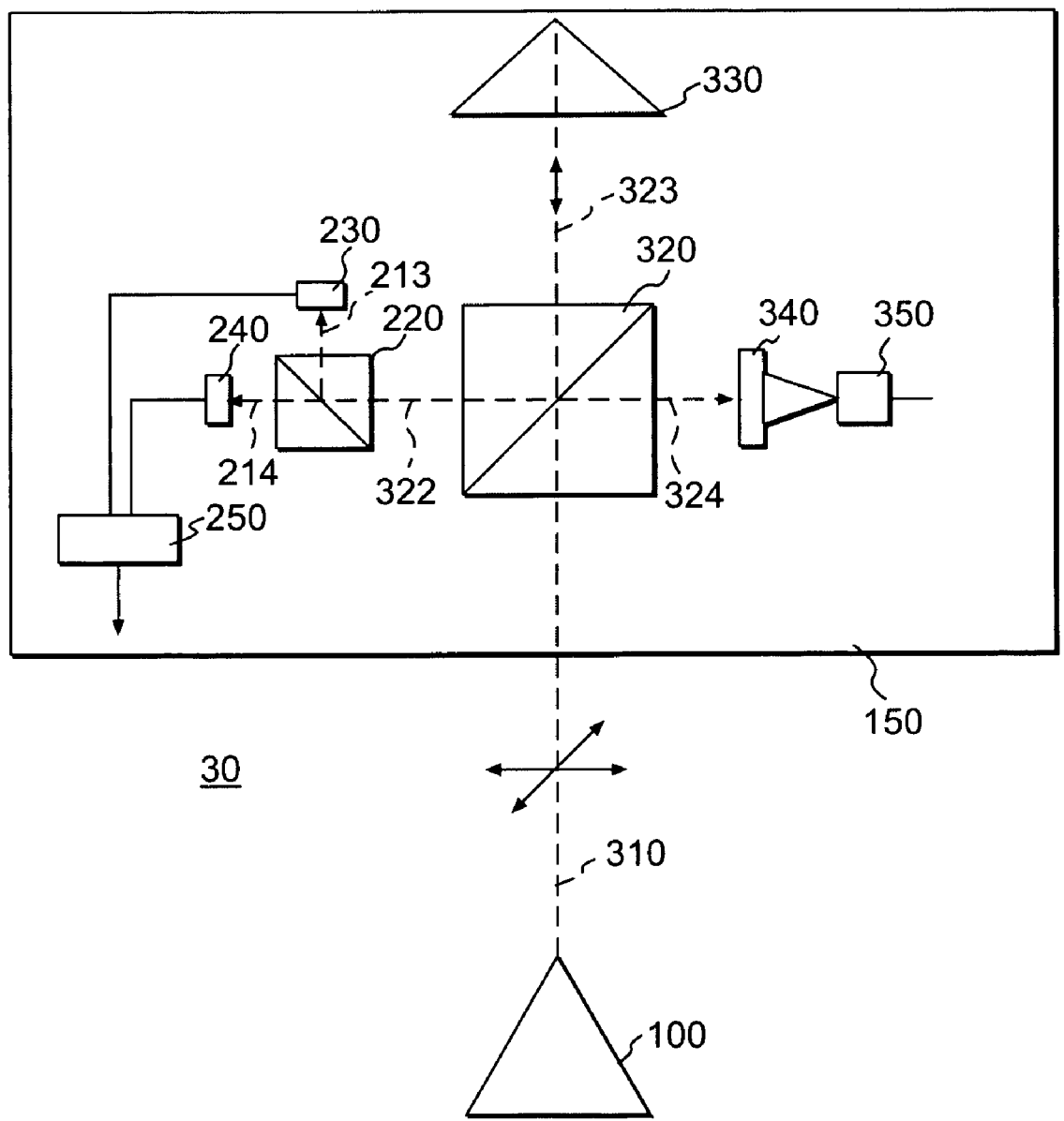
FIG. 3 is a schematic diagram illustrating an exemplary pitch, yaw, roll, and distance measuring system of the invention.

FIG. 3 is a schematic diagram illustrating an exemplary pitch, yaw, roll, and distance measuring system of the invention. In particular, components of 6-D laser tracking system 30 include a laser source present in tracking unit 100, polarized laser beam 310, beam splitter 320, corner cube 330, concentrator lens 340, two-dimensional photodetector 350, first photodetector 230, second photodetector 240, polarizing beam splitter 220, and roll determination circuit 250.

In operation, the laser source in tracking unit 100 emits polarized laser beam 310 that is split by beam splitter 320 into three paths 324, 323, and 322 directed toward concentrator lens 340, corner cube 330, and polarizing beam splitter 220, respectively.

Path 322 of beam 310 reflected by beam splitter 320 and directed toward polarized beam splitter 220 is used to determine the roll measurements, as discussed above. The combination of the roll, the pitch, and the yaw measurements made by target 150, along with the spherical coordinates associated with tracking unit 100, allows system 30 to obtain the six-dimensional tracking of target 150.

Path 323 of polarized laser beam 310 passing directly through beam splitter 320 is reflected by corner cube 330 and returned to tracking unit 100. Tracking unit 100, as discussed in Applicant's related patents referenced above, is then able to determine the distance between target 150 and tracking unit 100. However, it is to be appreciated that any method of determining an absolute distance measurement can be used with equal success with the systems and methods of this invention.

Path 324 directed towards concentrator lens 340 is focused onto two-dimensional photodetector 350 from which the pitch and yaw signals that drive the motors for target 150 are derived. In particular, as target 150 moves relative to the laser source in tracking unit 100, laser path 324 directed through concentrator lens 340 moves relative to two-dimensional photodetector 350. This movement can be detected and a corresponding signal representative of the pitch and/or yaw measurement can be obtained. Then, as discussed above, the pitch and/or yaw measurements can be used to control one or more motors on target 150 to maintain the perpendicular orientation of target 150 to tracking unit 100.

Figure 14:
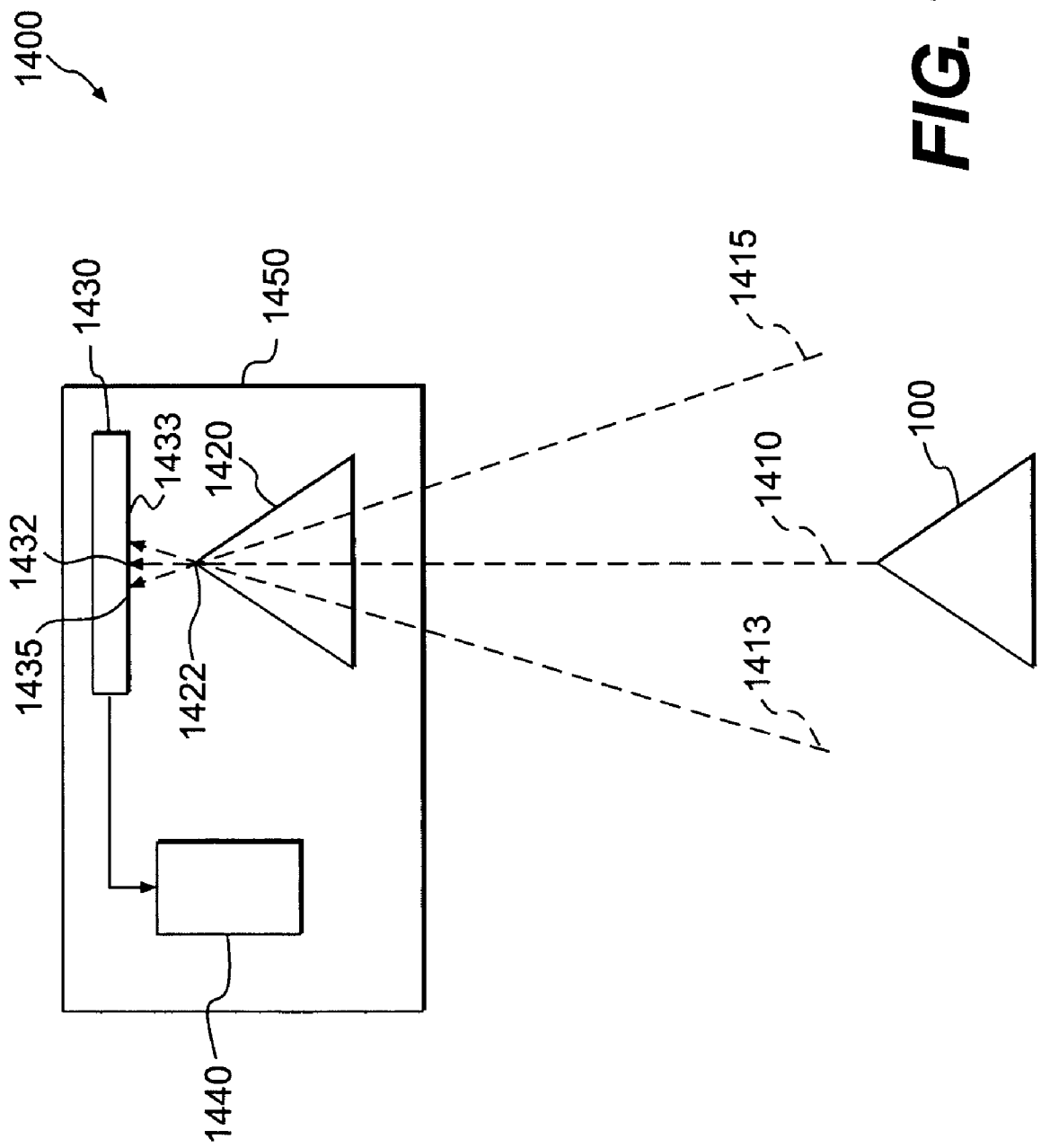
FIG. 14 is a two-dimensional schematic diagram showing another exemplary embodiment of a target of the invention that includes a retro-reflector.
Figure 15:
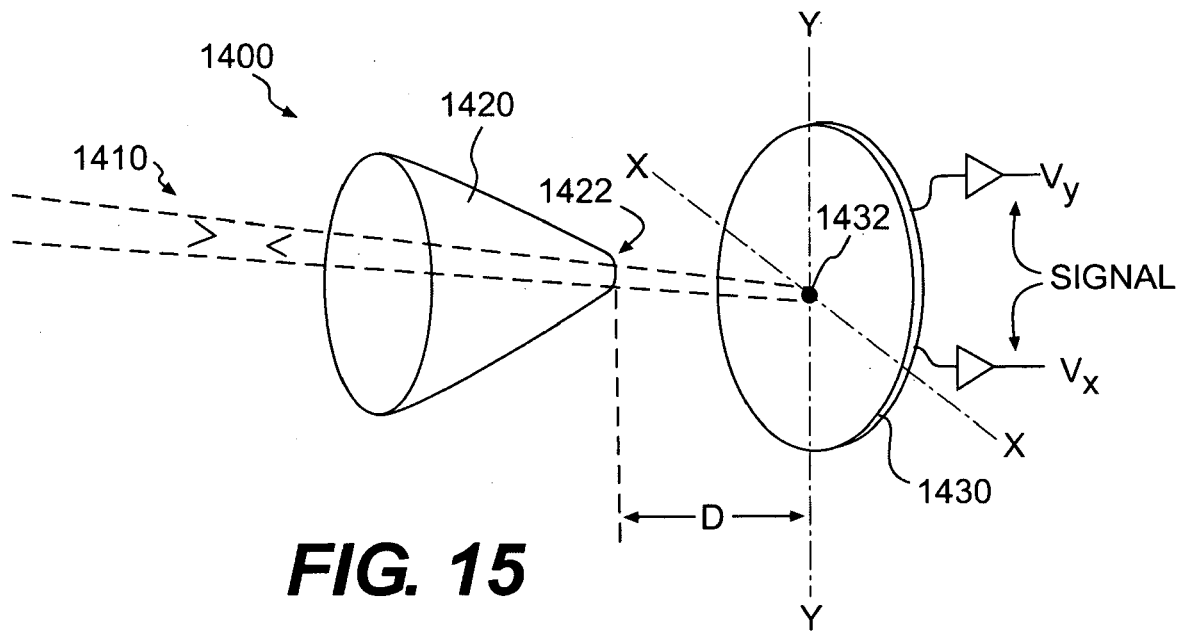
FIG. 15 is a three-dimensional schematic diagram showing the exemplary embodiment of FIG. 14.

FIG. 14 is a two-dimensional schematic diagram showing another exemplary embodiment of a target of the invention that includes a retro-reflector. FIG. 15 is a three-dimensional schematic diagram showing the exemplary embodiment of FIG. 14.

System 1400 of the invention includes tracking unit 100 and target 1450. Tracking unit 100 is the source of laser beams that are detectable by target 1450. Target 1450 includes retro-reflector 1420 and laser light sensor 1430. Laser light sensor 1430 can be, for example, a photodetector, such as photosensor 240 described above, or a charge coupled device (CCD) array sensor described below. Amplifier/repeater 1440 can be associated with laser light sensor 1430 to amplify analog signals or digital signals produced by laser light sensor 1430.

A laser beam light from tracking unit 100 that go through aperture 1422 of retro-reflector 1420 can be detected by laser light sensor 1430. Retro-reflector 1420 can be a hollow retro-reflector or a solid retro-reflector. Apex 1422 allows at least part of laser beam 1410 to go through to fall or focus onto laser light sensor 1430, which can be a photodetector or a CCD array sensor.

Figure 16:
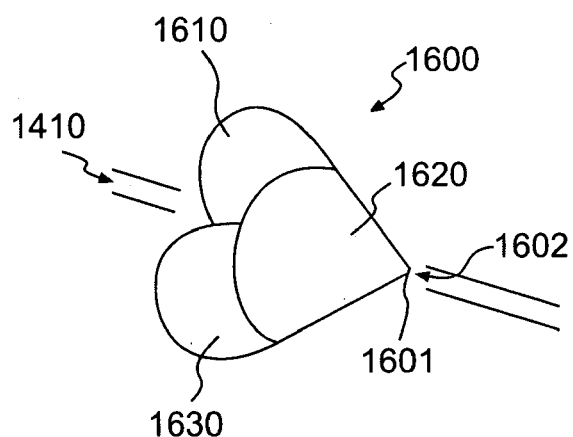
FIG. 16 is an exemplary hollow retro-reflector of the invention.

Preferably, retro-reflector 1420 is a hollow retro-reflector as shown in FIG. 16. Exemplary hollow retro-reflector 1600 shown in FIG. 16 includes three mirrors 1610, 1620, and 1630 that are positioned perpendicular to each other. A common extremity associated with mirrors 1610, 1620, and 1630 forms apex 1601 of hollow retro-reflector 1600. Aperture 1602 is preferably a tiny hole located at apex 1601 of hollow retro-reflector 1600. Aperture 1602 allows at least part of laser beam 1410 to go through to fall or focus onto laser light sensor 1430, which can be a photodetector or a CCD array sensor.

Figure 17:
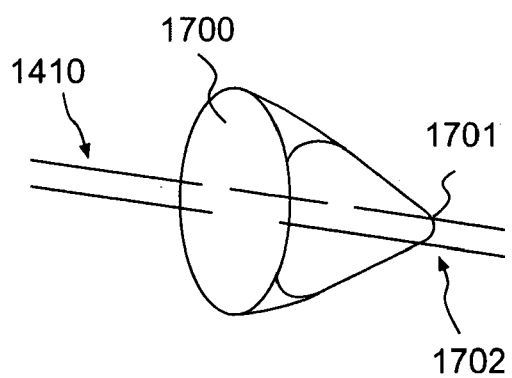
FIG. 17 is an exemplary solid retro-reflector of the invention.

If a solid retro-reflector is used, a small flat surface near the apex is polished to create a way to allow at least part of laser beam 1410 to go through to fall or focus onto laser light sensor 1430. As shown in FIG. 17, solid retro-reflector 1700 includes flat surface 1702 at apex 1701. Flat surface 1702 behaves similarly to aperture 1602 described above.

Retro-reflector 1420 and laser light sensor 1430 are configured to measure the pitch (see axis y—y in FIG. 15) and yaw (see axis x—x in FIG. 15) orientations or movements of target 1450. Vectors $V_y$ plus $V_x$ and distance D give angle position of incoming laser beam 1410 to target 1450. Target 1450 can be associated with a remote unit (e.g., robot 400, remote units 700, 800, and 1200 shown in FIGS. 4, 7, 8, and 12, respectively).

FIG. 14 schematically illustrate how a yaw movement associated with target 1450 can be measured. When target 1450 indicates no yaw movement, laser beam light 1410 goes through aperture 1422 and is detected by laser light sensor 1430 at an origin or reference point 1432. However, as indicated by laser paths 1413 and 1415, any yaw movement of target 1450 would result in laser beam light 1410 to be detected by laser light sensor 1430 at locations other than reference point 1432, for example, at points 1433 and 1435, for paths 1413 and 1415 of laser beam light 1410, respectively. Note that points 1433, 1432 and 1435 would be along axis x—x shown in FIG. 15. Preferably, retro-reflector 1420 and laser light sensor 1430 are configured to detect a large range of yaw movements. For example, retro-reflector 1420 and laser light sensor 1430 can measure yaw movements up to at least about 30 degrees, depending on size and other factors.

Similarly, the pitch movement of target 1450 can be detected and measured using retro-reflector 1420 and laser light sensor 1430. At a zero pitch movement, laser beam light 1410 goes through aperture 1422 and is detected by laser light sensor 1430 at reference point 1432. If there is a pitch movement, a different part of laser light sensor 1430, either above or below reference point 1432 in a direction perpendicular to the page, would detect the laser beam light. Note that these points would be along axis y—y shown in FIG. 15.

As discussed above, laser light sensor 1430 can be a photodetector. In a different embodiment of the invention, a CCD array sensor can be used as laser light sensor 1430. As known in the art, a CCD array sensor can include multiple pixels arranged in an array. Preferably, a CCD array sensor in accordance with the invention includes about 1,000 by 1,000 pixels. Larger or smaller number of pixels may also be used. Digital output from the CCD array sensor can processed by a corresponding repeater 1440. The CCD array sensor is used to detect one or both yaw and pitch movements of target 1450. The use of CCD array sensor for detection of light is known in the art, for example, in digital cameras. Therefore, no further description is believed to be warranted here.

Inclusion of retro-reflector 1420 and laser light sensor 1430 in target 1450 as described above provides several advantages. For example, a remote unit (e.g., one of remote units 700, 800, and 1200) associated with retro-reflector 1420 can be more functional in an upside-down orientation, which is otherwise not possible. In addition, the use of retro-reflector 1420 allows a target and/or a remote unit of the invention to be smaller in size and/or lighter in weight.

Figure 4:
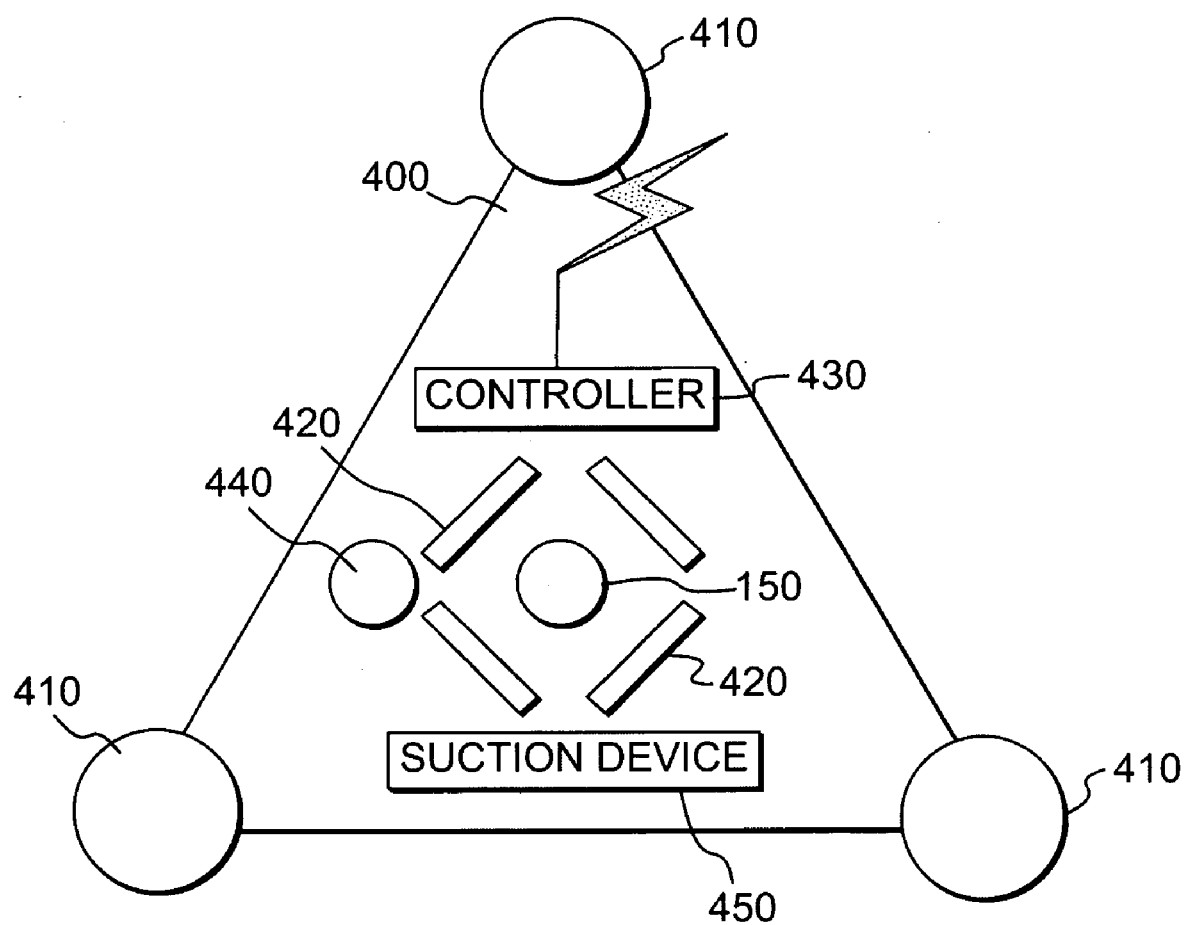
FIG. 4 is a schematic diagram illustrating an exemplary remote unit incorporating an exemplary target of the invention.

FIG. 4 illustrates an exemplary remote unit of the invention. Robot 400 includes a plurality of suction cup type devices 410, drive mechanism 420, controller 430, accessory 440, suction device 450, and a target. The target can be, for example, one of target 150 and target 1450. Robot 400 also includes various other components such as a power supply, battery, solar panels, or the like that have been omitted for the sake of clarity and would be readily apparent to those of ordinary skill in the art.

In operation, the combination of target 150 in conjunction with robot 400 allows, for example, precise movement and location tracking of robot 400. While a particular robotic active target is discussed below, it is to be appreciated that in general the target can be fixably attached to any object to allow monitoring of up to six degrees of freedom of the object, or, alternatively, the target can be attached to a movable device and the position of that device monitored.

Suction cup type devices 410 are connected to suction device 450 via, for example, hoses (not shown) that enable robot 400 to remain affixed to a surface. For example, controller 430, in conjunction with suction device 450 and suction cup type devices 410 can cooperate with drive systems 420 such that robot 400 is able to traverse a surface. For example, suction cup type devices 410 and drive mechanism 420 can cooperate such that sufficient suction is applied to suction cup type devices 410 to keep robot 400 affixed to a surface, while still allowing the drive mechanism 420 to move the robot 400 over the surface. For example, drive mechanism 420 can include four wheels, and associated drive and suspension components (not shown). The wheels allow the traversal of robot 400 over a surface while maintaining the rotational orientation of robot 400 relative to tracking unit 100. However, in general, while it is simpler to operate robot 400 such that the rotational orientation remains constant relative to tracking unit 100, the system can be modified in conjunction with the use of the polarized laser to account for any rotational movement that may occur. Specifically, for example, the rotational movement of robot 400 can be algorithmically "backed-out" of the orientation measurements based on the polarized laser to account for any rotation of robot 400.

Furthermore, it should be appreciated that while robot 400 includes suction device 450 and suction cup type devices 410, any device, or combination of devices, that are capable of movably fixing robot 400 to a surface would work equally well with the systems and methods of the invention. For example, a positive air pressure system can be used to force robot 400 to be movably fixed to the surface. For example, the positive air pressure system can include an air blowing unit that blows air downwards when robot 400 is traversing under, rather than above, the surface. The downward air movement keeps robot 400 movably fixed under the surface. Additionally, depending on the surface type, a magnetic, gravitational, resistive, or the like type of attachment system could be employed.

Controller 430, which can, for example, be in wired or wireless communication with a remote controller (not shown), allows for navigation of robot 400 in cooperation with drive mechanism 420. For example, drive mechanism 420 can include a plurality of electric motors connected to drive wheels, or the like.

Accessory 440, can be, for example, a marking device, a tool, such as a drill, a painting attachment, a welding or cutting device, or any other known or later developed device that needs precise placement on a surface. The accessory can be activated, for example, remotely in cooperation with controller 430. In addition, accessory 440 can include a vacuum system.

Since accessory 440 is located on a known distance from target 150, the exact position of accessory 440 is always known. Thus, a user can position accessory 440 in an exact location such that accessory 440 can perform an action at that location. For example, a local effect sensor like a strip camera, a Moiré fringe patent sensor, or a touch probe can be attached to the end of target 150. Tracking unit 110 combined with target 150 can provide the orientation of the local sensor in a spatial relationship with the part to be measured while the local sensor is measuring the contours of a part, such as a car body, a building, a part in an environmentally hazardous area, or the like.

Figure 5:
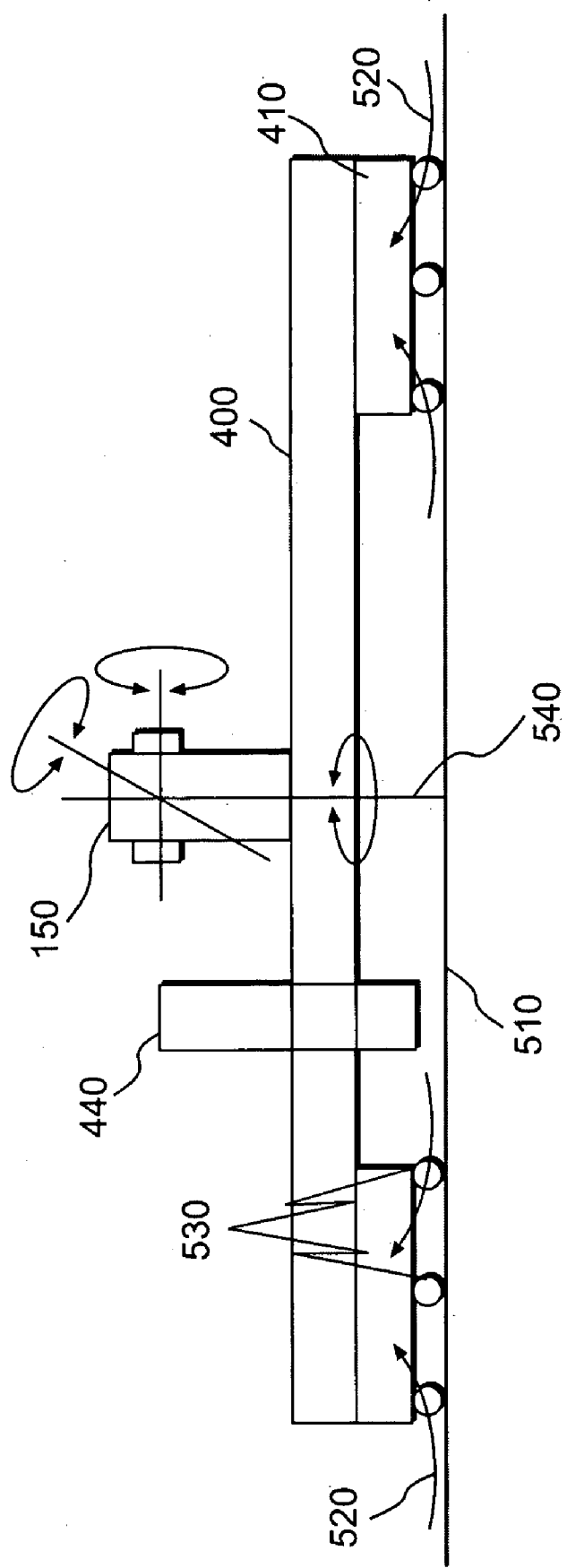
FIG. 5 is a schematic cross-sectional view of an exemplary remote controlled robot of the invention.

FIG. 5 illustrates an exemplary schematic, cross-sectional view of robot 400. In this illustration, robot 400 is shown to include movable distance determining device 540. In addition to position sensing equipment associated with target 150, movable distance determining device 540 extends from the base of robot 400 to surface 510. Distance determining device 540 measures the exact distance between target 150 and surface 510 such that the exact location of the surface 510 relative to target 150 is always known.

As illustrated in FIG. 5, suction cup type devices 410 are located a fixed distance above surface 510 via spacers 530. For example, spacers 530 can be a bearing, or other comparable device that allows for suction cup type devices 410 to remain a fixed distance above surface 510 while still allowing air 520 to create a suction between robot 400 and surface 510.

Given the mobility of robot 400, it is foreseeable that robot 400 may not always be in communication with tracking unit 100. In the event robot 400 loses line-of-sight with tracking unit 100, the 6-D laser tracking system can then enter a target acquisition mode.

In the target acquisition mode, a user can, for example, with a joystick, aim tracking unit 100 generally in the vicinity of robot 400. Tracking unit 100 then commences a target acquisition process in which tracking unit 100 begins a spiral type pattern that spirals outward to locate target 150. Upon acquisition of target 150, communication between tracking unit 100 and target 150 is established and the six-dimensional measurements are again available.

Alternatively, for example, target 150 can maintain communication with tracking unit 100 via, for example, a radio communication link, or other known or later developed system that allows the tracking unit 100 to track the relative position of target 150 regardless of whether line-of-sight is present. Thus, when line-of-sight is reestablished, as discussed above, the six-dimensional measurements are available.

Figure 6:
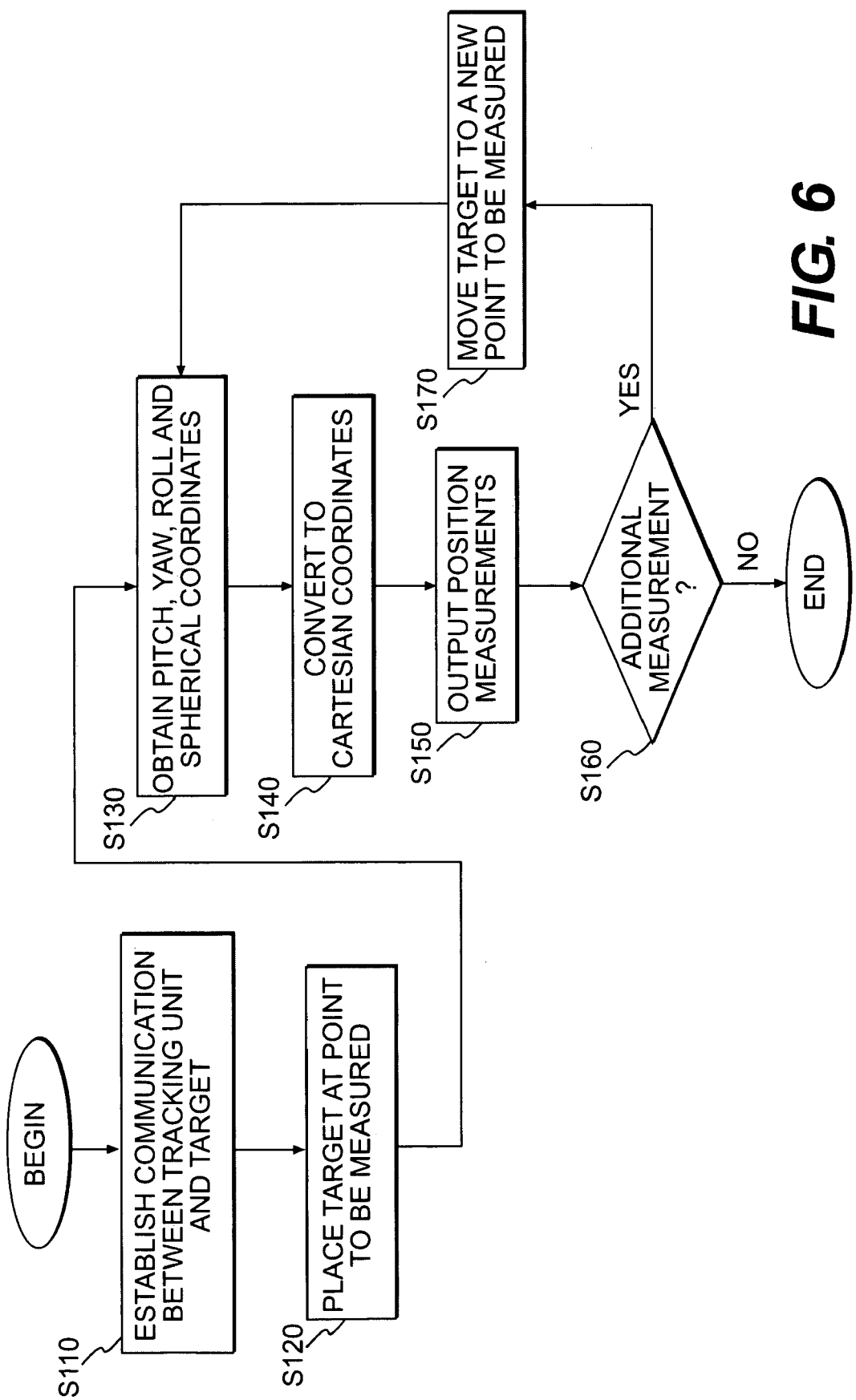
FIG. 6 is a flowchart illustrating an exemplary method of taking measurements according to the invention.

FIG. 6 is a flowchart illustrating an exemplary method of taking measurements according to the invention. In particular, control begins in step S110 where communication between a tracking unit (e.g., tracking unit 100) and a target (e.g., target 150) are established. For example, for an interferometer based system, the target can be placed at a known position to both establish communication with the tracking unit as well as to initialize the system. For an absolute distance measurement system the target is placed in communication with the laser and an approximate radial distance (R) obtained.

Next, in step S120, the target is placed at a first point to be measured.

Then, in step S130, the pitch, yaw, roll, and spherical coordinates are obtained.

In step S140, the spherical coordinates are converted to Cartesian (x,y,z) coordinates, where x is the horizontal position, y the in/out position, and z the up/down position of the target.

Then, in step S150, the position measurements are output.

Control then continues to step S160 in which a determination is made on whether additional points should be measured. If so, the process goes to step S170; otherwise, the process ends.

In step S170, the target is moved to a new point to be measured. In an embodiment in which the target is coupled to a remote unit such as a robot, the robot is commanded to move to the new point. The process then return to step S130.

There may be instances, for example, where the point to be measured is not in the line-of sight of the tracking unit, or, alternatively, for example, the point to be measured is inaccessible by the target. FIGS. 7–13 illustrate exemplary embodiments in which a probe assembly is associated with the target in a remote unit to take measurements at points that is otherwise inaccessible by the target.

Figure 7:
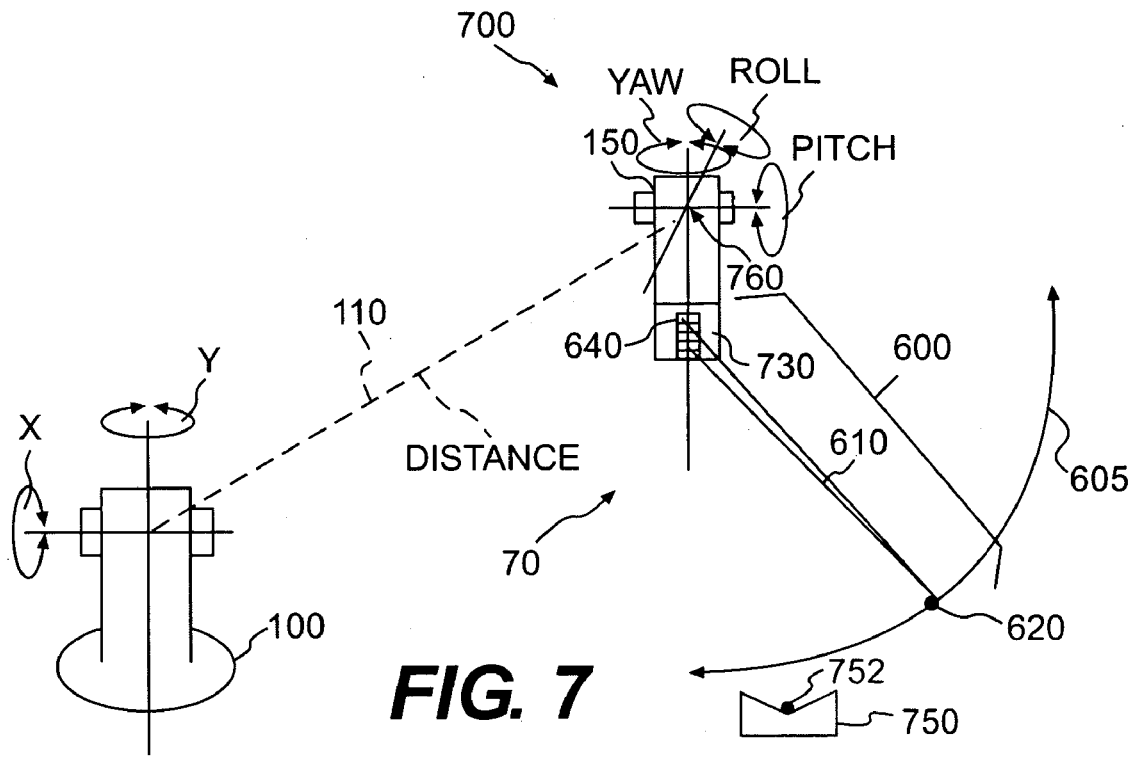
FIG. 7 is a schematic diagram illustrating an exemplary multi-dimensional measuring system of the invention that includes an exemplary tracking unit and an exemplary remote unit.

FIG. 7 is a schematic diagram illustrating an exemplary multi-dimensional measuring system of the invention that includes an exemplary tracking unit and an exemplary remote unit. Multi-dimensional measuring system 70 includes tracking unit 100 and remote unit 700. Remote unit 700 includes target 150, probe assembly 600. Probe assembly 600 includes probe stem 610, probe tip 620, and probe base 730. Remote unit 700 is configured to obtain positional information of a point or location that is touchable by probe tip 620, but which is not in the line of sight of tracking unit 100.

In this embodiment, target 150, as described above, can make pitch, yaw, and roll movements about origin 760, the position of which can be determined because it is in the line of sight of tracking unit 100. Probe 620 is configured to touch or come into contact with a point or location that is not in the line of sight of tracking unit. Probe tip 620 is connected to probe base 730 by probe stem 610. In one embodiment, probe base 730 is fixed or immovable with respect to target 150. In such embodiment, probe base 730 itself cannot make any pitch, yaw, or roll movements. However, probe tip 620 can move pivoting about probe base 730 along circle 605, which forms a disc shape point cloud perpendicular to the page. Thus, in additional to the previously described six dimensions associated with target 150, the movement of probe tip 620 adds the seventh dimension, making system 70 a seven dimensional system.

A point or location that is not in the line of sight of tracking unit 100, but which is touchable by probe tip 620, can be determined as follows.

First, probe stem 610 is locked in place relative to probe base 730. Probe stem 610 can be locked in place using a number of different methods. For example, probe stem 610 can be locked in place with the use of a wing nut and associated locking teeth 640.

Second, target 150 is brought closer to seat 750 and probe 620 comes into contact with center 752 of seat 750. Center 752 of seat 750 is a known location. For example, the position (x, y, z) of center 752 relative to tracking unit 100 can be determined using a system and method shown in FIGS. 19 and 20, which are described below. Because origin 760 can be measured by tracking unit 100 directly, and center 752 of seat 750 has a known position, the vector of point tip 620 relative to origin 760 is established.

Third, target 150 is moved to measure a point or location that is touchable by probe tip 620. Using computer software or other known methods, position information associated with the point or location touched by probe tip 620 can be calculated base on the position information of origin 760 and the vector of point 620 relative to origin 760.

In lieu of using seat 750 to determine the vector of point 620 relative to origin 760, one or more encoders coupled to probe base 730 can be used.

Figure 8:
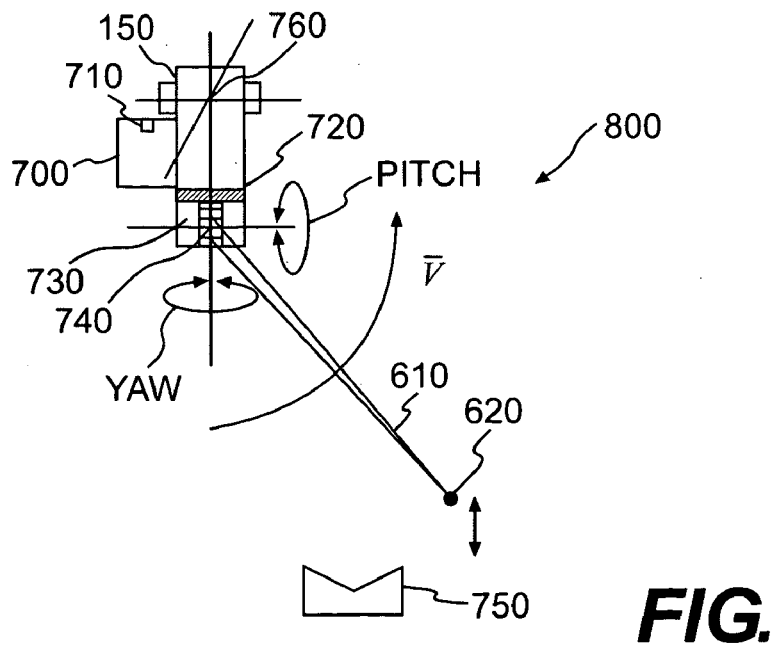
FIG. 8 is a schematic diagram illustrating another exemplary remote unit of the invention.

FIG. 8 is a schematic diagram illustrating another exemplary remote unit of the invention. Remote unit 800 shown in FIG. 8 includes probe assembly 600 that is configured to move along two axes, which makes remote unit 800, when used with tracking unit 100, an eight-dimensional measuring system. In accordance with this exemplary embodiment, in addition to target 150, probe assembly 600, remote unit 800 further includes encoders 720 and 740. Optionally, remote unit 800 further includes handle assembly 700 (which includes trigger 710).

In this exemplary embodiment, yaw movements of probe base 730 is measured by encoder 720, and pitch movements of probe base 730 is measured by encode 740. Thus, in this embodiment, probe tip 620 can be moved about probe base 730 to establish a spherical point cloud about probe base 730. The vector of probe tip 620 relative to origin 760 can be established using measurements taken by encoders 720 and 740.

To measure a point or location touchable by probe tip 620, the following steps can be used.

First, target 150 is brought near the point or location and probe tip 620 is moved about probe base 730 so that probe tip can come into contact with the point or location. Second, because origin 760 is in the line of sight of tracking unit 100, the six dimensions associated with target 150 can be obtained as described above. Third, using information obtained by encoders 720 and 740, which establishes the vector of probe tip 620 relative to origin 760, position information associated with the point or location can be obtained. Preferably, the second and third steps can be performed in a single step using by squeezing trigger 710.

Figure 9:
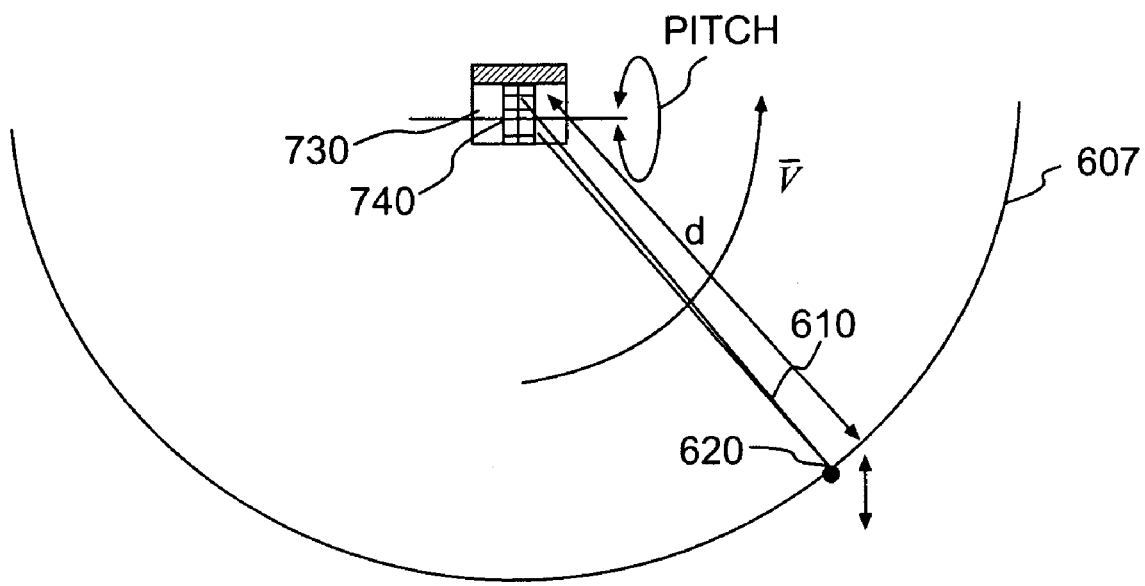
FIG. 9 is a schematic diagram illustrating an exemplary probe assembly of the invention.

FIG. 9 is a schematic diagram illustrating an exemplary probe assembly of the invention. Exemplary point cloud 607, if projected in three dimensions relative to probe base 730, represents the distance d of probe tip 620 from an origin, such as probe base 730.

Figure 10:
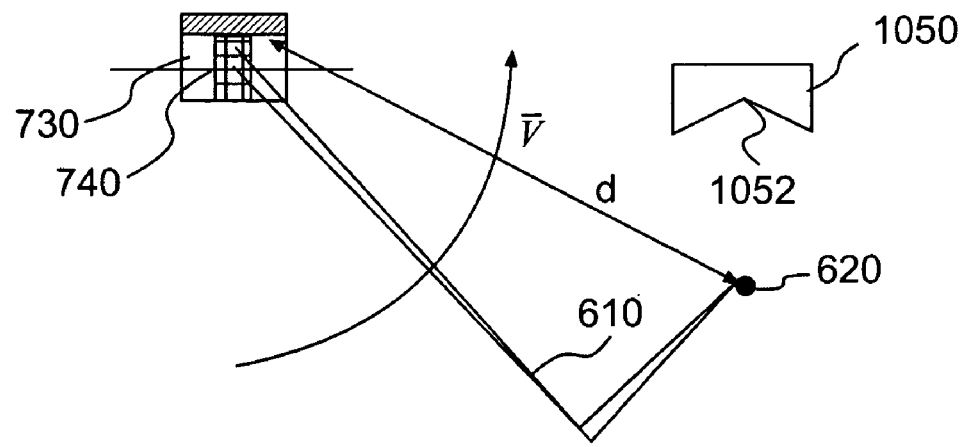
FIG. 10 is a schematic diagram illustrating another exemplary probe assembly of the invention.

FIG. 10 is a schematic diagram illustrating another exemplary probe assembly of the invention. In this embodiment, probe stem 610 has an "L" shape configuration rather than a straight "I" shape configuration. However, in general, probe stem 610 can be in any shape and the user only need adjunct seat 750 such as to allow probe tip 620 to sit in seat 750 during initialization to create the point cloud. As depicted in FIG. 10, the "L" shape probe stem 610 enables probe tip 620 to touch a bottom surface of an object, such as bottom surface 1052 of object 1050.

Figure 11:
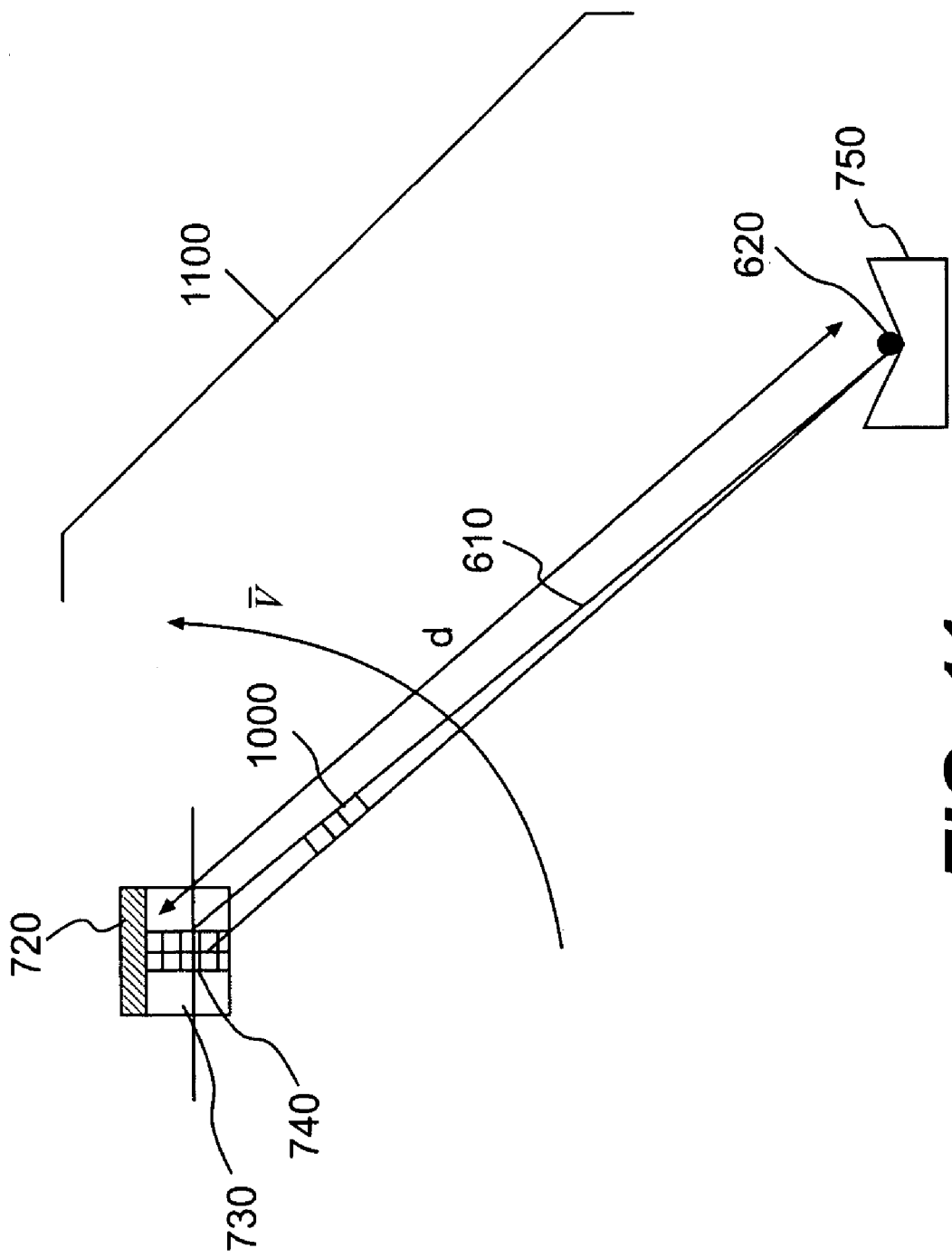
FIG. 11 is a schematic diagram illustrating another exemplary probe assembly of the invention.

FIG. 11 is a schematic diagram illustrating another exemplary probe assembly of the invention. Probe assembly 1100 and tracking unit 100 constitute a nine-dimensional version of an exemplary tracking system according to this invention. In particular, in addition to the movements of probe stem 610 illustrated in FIGS. 7 and 8, probe stem 610 in FIG. 11 is capable of extending in a longitudinal direction, i.e., telescoping, so that distance d can be varied. With the aid of encoder 1000, which can be, for example a glass-scale encoder, a linear scale encoder, a magnescale encoder, or the like, the length of probe stem 610 can be determined.

In operation, a user can either adjust the length or orientations of probe stem 610 and perform initialization, with the length of probe stem 610 remaining static during measurements, or, in addition to the steps enumerated above, also vary the length of probe stem 610 during initialization to create a semi-solid point cloud (not shown) that represents the distance d of probe tip 620 from an origin relative to the rotational movement of probe base 730, the length of extension of probe stem 610, and the rotational movement of probe tip 620 about probe base 730. The various readings from the encoders 720, 740, and 1000 can then be stored to be used for actual position determination during the measurement process.

Then, during use, one or more of probe length, e.g., distance d (measured by encoder 1000), probe rotation in yaw direction (measured by rotary encoder 720), and probe rotation in pitch direction (measured by encoder 740) can be varied by the user as appropriate to allow probe tip 620 to be placed on the object to be measured. Furthermore, while probe tip 620 is illustrated herein is a sphere, it is to be appreciated that the tip can be any shape, such as a point, cup, or bearing that allows probe tip 620 to move across an object, or the like. For example, as discussed previously, a measurement can be taken instantaneously using trigger 710 (see FIG. 8), or continuously, for example, while probe tip 620 traverses an object.

Figures 12, 13:
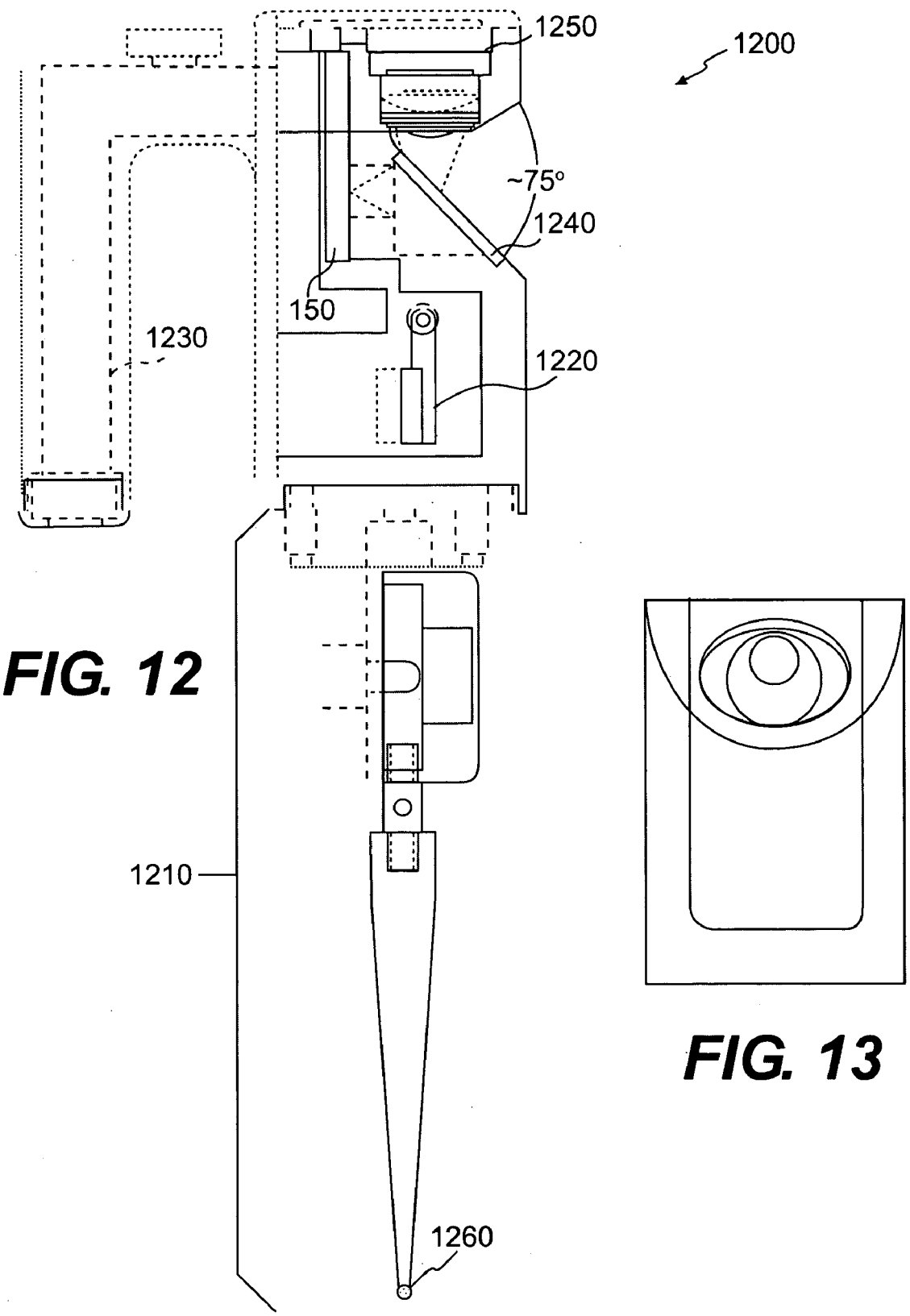
FIG. 12 is a schematic diagram illustrating an exemplary remote unit of the invention.
FIG. 13 is a schematic diagram illustrating a front view of the exemplary remote unit shown in FIG. 12.

FIGS. 12 and 13 are schematic diagrams illustrating different views of an exemplary remote unit of the invention. Remote unit 1200 includes target 150 that has been described above. Target 150 includes beam splitter 1240 and a plurality of photodetectors 1250. Remote unit 1200 further includes adjustable probe assembly 1210, electronic level 1220, and handle 1230 Probe assembly 1210 includes probe tip 1260.

The operation of remote unit 1200 involves a user maintaining an orientation between remote unit 1200 and a tracking unit (e.g., tracking unit 100 shown in FIG. 1). Measurements with remote unit 1200 can be accomplished in a similar fashion to that discussed in relation to remote units 700 and 800 above. Specifically, an initialization is performed to determine the position of probe tip 1260 in relation to remote unit 1200. The initialization can occur after fixing of probe assembly 1210 in a fixed position or, alternatively, by moving probe assembly 1210 through a plurality of positions and, for example, creating a point cloud as discussed above. Alternatively, probe tip 1260 can be placed at various positions on a known object, such as a sphere, and initialization accomplished.

When a measurement associated with a location touched by probe tip 1260 is to be taken, a trigger associated with handle 1230 is squeezed. Alternatively, probe tip 1260 can be configured to be touch-sensitive. For example, in an exemplary implementation of the invention, probe tip 1260 is associated with a touch sensor. In the exemplary implementation, a measurement is taken by remote unit 1200 whenever probe tip 1260 comes into contact with the location. In this context, the contact is a physical contact.

In other implementations, the contact can be effected when probe tip 1260 comes into close proximity with the location. Such non-physical contact can be accomplished using, for example, magnetic or infrared devices that are associated with probe tip 1260.

Remote unit 1200 can determine roll based on, for example an electronic level technique or, for example, using the differential amplifier technique discussed above. The electronic level technique can be implemented using electronic level 1220.

Figure 18:
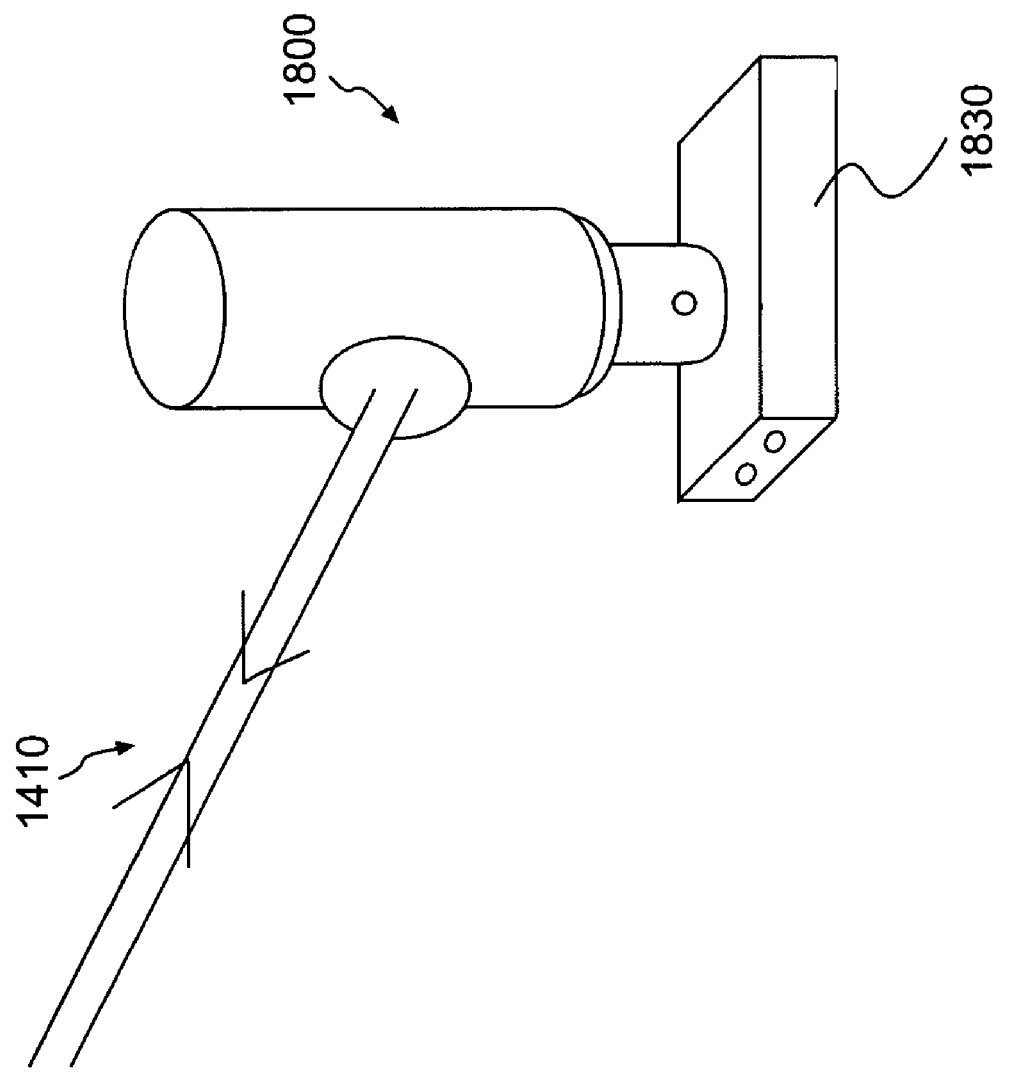
FIG. 18 is a schematic diagram showing another exemplary embodiment of a remote unit of the invention that includes an optical measuring sensor.

FIG. 18 is a schematic diagram showing another exemplary embodiment of a remote unit of the invention that includes an optical measuring sensor. Remote unit 1800 includes optical measuring sensor 1830. Optical measuring sensor 1830 can be used to measure an area or a surface geometry. Preferably, optical measuring sensor 1830 is located near a bottom portion of remote unit 1800, as shown in FIG. 18. However, optical measuring sensor 1830 can be otherwise associated with remote unit 1800, including near a top or a side portion of remote unit 1800.

Figure 19:
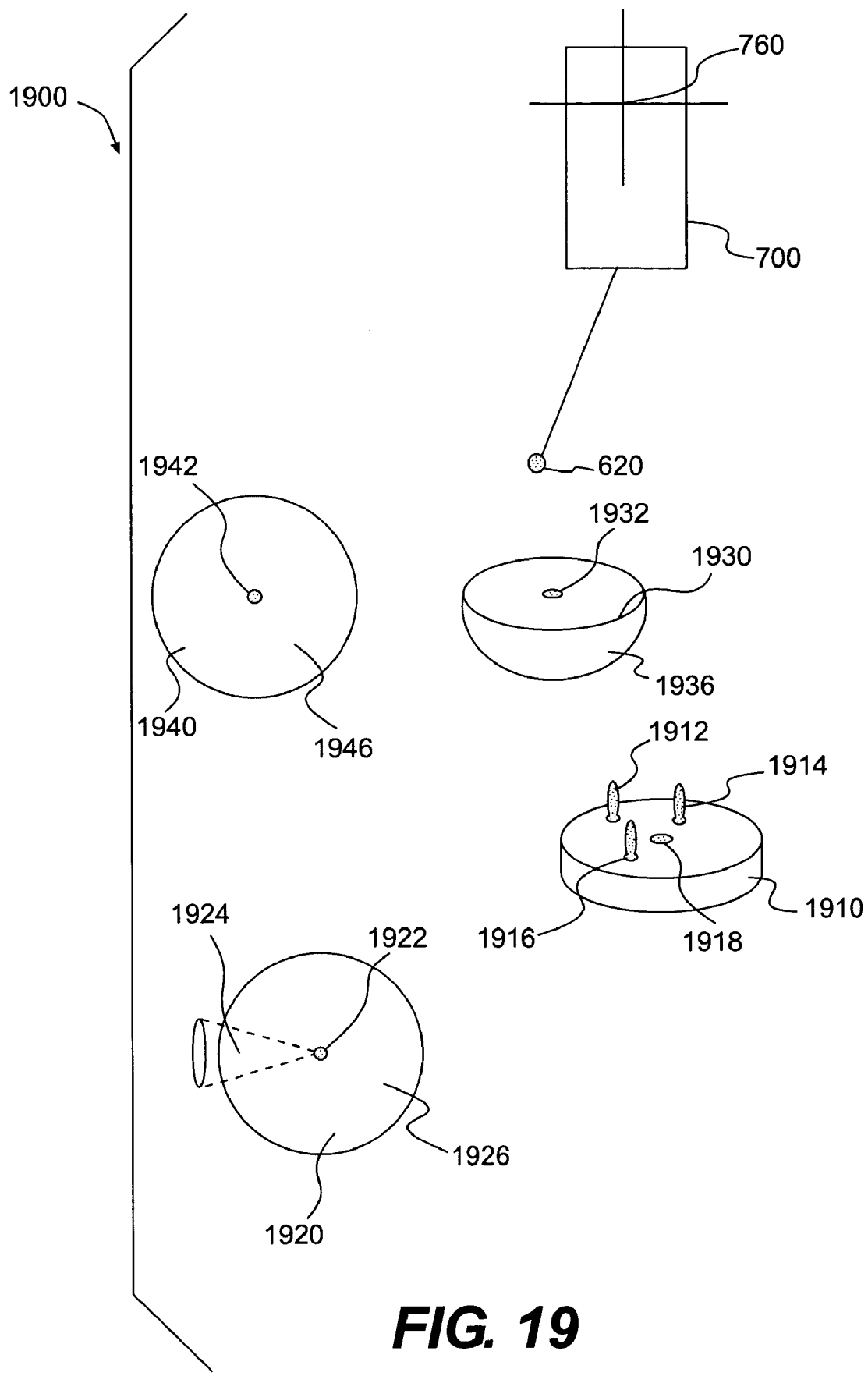
FIG. 19 is a schematic diagram showing an exemplary system for establishing the vector of a probe tip relative to an origin of a target associated with the probe tip.

FIG. 19 is a schematic diagram showing an exemplary system for establishing the vector of a probe tip relative to an origin of a target associated with the probe tip. System 1900 includes remote unit 700 with origin 760 and probe tip 620 as described above. Probe tip 620 can be, for example, a ruby sphere. System 1900 further includes magnetic puck 1910, spherical mounted retro-reflector (SMR) 1920, and one or both dummy units 1930 and 1940.

Magnetic puck 1910 includes a plurality of supports 1912, 1914, and 1916. Magnetic puck 1910 further includes magnet 1918. Supports 1912, 1914, and 1916 are configured to support one of SMR 1920, hemispherical dummy unit 1930, and spherical dummy unit 1940. Preferably, each of SMR 1920 and dummy units 1930, 1940 are made of magnetic stainless steel so that magnet 1918 of magnetic puck 1910 can secure it on supports 1912, 1914, and 1916. Preferably, magnet 1918 is disposed at a location among supports 1912, 1914, and 1916.

SMR 1920 includes retro-reflector 1924 that is housed within body 1926 of SMR 1920. Retro-reflector 1924 can be a hollow retro-reflector (e.g., similar to hollow retro-reflector 1600) or a solid retro-reflector (e.g., similar to solid retro-reflector 1700). Body 1926 is preferably made of magnetic stainless steel. SMR 1920 can have a range of diameters. Typical diameters of SMR 1920 are 0.5 inch, 0.75 inch, 1.0 inch, and so on. Retro-reflector 1924 includes apex 1922. Preferably, SMR 1920 is configured so that apex 1922 is located at the center of SMR 1920.

Hemispherical dummy unit 1930 includes body 1936 and center 1932. Hemispherical dummy unit 1930 has a diameter that is same as the diameter of SMR 1920 so that the location of center 1932 correspond with the location of apex 1922. Body 1936 is preferably made of magnetic stainless steel.

Spherical dummy unit 1940 includes body 1946 and center 1942. Spherical dummy unit 1940 has a diameter that is same as the diameter of SMR 1920 so that the location of center 1942 correspond with the location of apex 1922. Body 1946 is preferably made of magnetic stainless steel.

Figure 20:
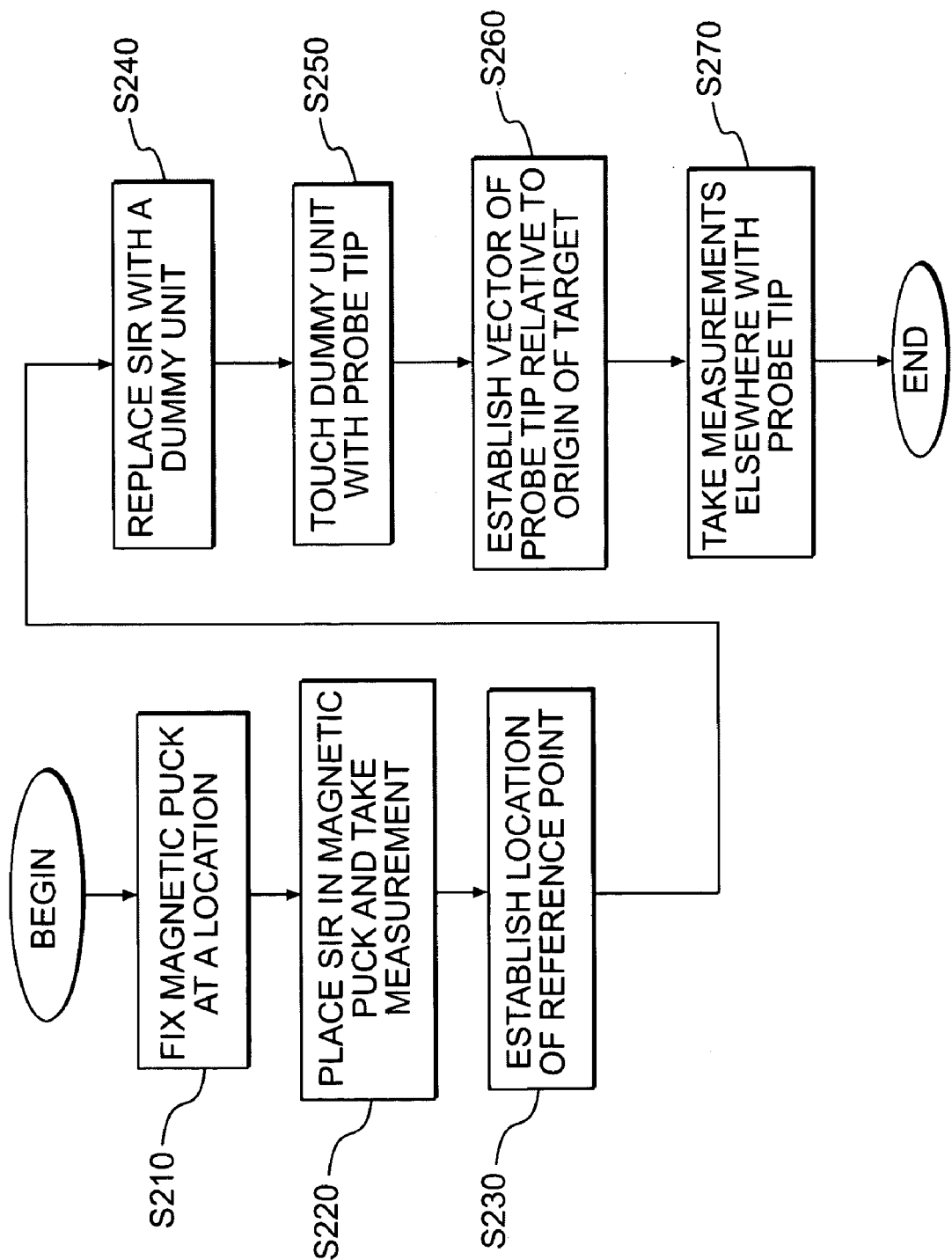
FIG. 20 is a flowchart illustrating an exemplary method of establishing the vector of the probe tip depicted in FIG. 19.

FIG. 20 is a flowchart illustrating an exemplary method of establishing the vector of the probe tip depicted in FIG. 19.

In step S210, magnetic puck 1910 is fixed to a location, e.g., the location of seat 750 shown in FIG. 7. Preferably, magnetic puck 1910 is secured to the location so that placement or removal of SMR 1920 or dummy units 1930, 1940 would not move magnetic puck 1910.

In step S220, SMR 1920 is placed on magnetic puck 1910. Preferably, SMR 1920 is secured to magnetic puck 1910 by magnet 1918 on supports 1912, 1914, and 1916.

In step S230, position information of apex 1922 can be obtained by a tracking unit, e.g., tracking unit 100 shown in FIG. 7. In this manner, SMR 1920 behaves as a target in a conventional three dimensional measurement system.

In step S240, SMR 1920 is replaced with one of dummy units 1930 and 1940 on magnetic puck 1910. For example, SMR 1920 is removed and one of dummy units 1930 and 1940 is placed on magnetic puck 1910, secured by magnet 1918 on supports 1912, 1914, and 1916.

In step S250, probe tip 620 is brought to touch the dummy unit to establish the position information of the center of the dummy unit in step S260.

If hemispheric dummy unit 1930 is used, probe tip 620 touches center 1932 of hemispheric dummy unit 1930. Because the diameter of hemispheric dummy unit 1930 is same as the diameter of SMR 1920, the position of center 1932 corresponds with the position of apex 1922, which was obtained in step S230.

In step S260, the vector of probe tip 620 relative to origin 760 of remote unit 700 is established. This can be done because, as explained above, origin 760 is in the line of sight of tracking unit 100 and probe tip 620 touches a known location, which is center 1932, the position established in step S230 by apex 1922.

If spherical dummy unit 1940 is used in step S240, probe tip 620 cannot touch center 1940 directly. However, the position of center 1940 can be established by probe tip 620 touching four or more points on body 1946 in step S250. Because the diameter of spherical dummy unit 1940 is same as the diameter of SMR 1920, the position of center 1942 corresponds with the position of apex 1922, which was obtained in step S230. The vector of probe tip 620 relative to origin 760 can then be established in step S260.

In step S270, probe tip 620 can be used to take measurements at various points and locations.

As illustrated in the figures and described above, the multi-dimensional systems of the invention can be implemented either on a single programmed general purpose computer, or a separate programmed general purpose computer and associated laser generating and detecting, motor and rotary encoder components. However, various portions of the multi-dimensional laser tracking system can also be implemented on a special purpose computer, a programmed microprocessor or microcontroller and peripheral integrated circuit element, an ASIC or other integrated circuit, a digital signal processor, a hard-wired electronic or logic circuit such as a discrete element circuit, a programmable logic device such as a PLD, PLA, FPGA, PAL, or the like. In general, any device capable of implementing a state machine that is in turn capable of implementing the measurement techniques discussed herein and illustrated in the drawings can be used to implement the multi-dimensional laser tracking system according to this invention.

Furthermore, the disclosed methods may be readily implemented in software using object or object-oriented software development environments that provide portable source code that can be used on a variety of computer or workstation hardware platforms. Alternatively, the disclosed multi-dimensional laser tracking system may be implemented partially or fully in hardware using standard logic circuits or VLSI design. Whether software or hardware is used to implement the systems in accordance with this invention is dependent on the speed and/or efficiency requirements of the system, the particular function, and the particular software and/or hardware systems or microprocessor or microcomputer systems being utilized. The multi-dimensional laser tracking system and methods illustrated herein, however, can be readily implemented in hardware and/or software using any known or later-developed systems or structures, devices and/or software by those of ordinary skill in the applicable art from the functional description provided herein and a general basic knowledge of the computer and optical arts.

Moreover, the disclosed methods may be readily implemented as software executed on a programmed general purpose computer, a special purpose computer, a microprocessor, or the like. In these instances, the methods and systems of this invention can be implemented as a program embedded on a personal computer such as a Java® or CGI script, as a resource residing on a server or graphics workstation, as a routine embedded in a dedicated multi-dimensional laser tracking system, or the like. The multi-dimensional laser tracking system can also be implemented by physically incorporating the system and method into a software and/or hardware system, such as the hardware and software systems of a multi-dimensional laser tracking system.

It is, therefore, apparent that there has been provided, in accordance with the present invention, systems and methods for multi-dimensional laser tracking. While this invention has been described in conjunction with a number of exemplary embodiments, it is evident that many alternatives, modifications and variations would be or are apparent to those of ordinary skill in the applicable arts. Accordingly, the invention is intended to embrace all such alternatives, modifications, equivalents and variations that are within the spirit and scope of this invention.

The foregoing disclosure of the preferred embodiments of the present invention has been presented for purposes of illustration and description. It is not intended to be exhaustive or to limit the invention to the precise forms disclosed. Many variations and modifications of the embodiments described herein will be apparent to one of ordinary skill in the art in light of the above disclosure. The scope of the invention is to be defined only by the claims appended hereto, and by their equivalents.

Further, in describing representative embodiments of the present invention, the specification may have presented the method and/or process of the present invention as a particular sequence of steps. However, to the extent that the method or process does not rely on the particular order of steps set forth herein, the method or process should not be limited to the particular sequence of steps described. As one of ordinary skill in the art would appreciate, other sequences of steps may be possible. Therefore, the particular order of the steps set forth in the specification should not be construed as limitations on the claims. In addition, the claims directed to the method and/or process of the present invention should not be limited to the performance of their steps in the order written, and one skilled in the art can readily appreciate that the sequences may be varied and still remain within the spirit and scope of the present invention.

What is claimed is:

1. A remote unit associated with a multi-dimensional measuring system comprising:
    a target in communication with a tracking unit of the multi-dimensional measuring system, the target being capable of making pitch, yaw, and roll movements; and
    a probe assembly coupled to the target, the probe assembly comprises a probe tip, a probe stem, and a probe base, wherein the probe tip is configured to reach locations not within a line of sight between the tracking unit and the target.

2. The remote unit of claim 1, further comprising one or more encoders coupled to the probe assembly.

3. The remote unit of claim 2, wherein at least one of the encoders is configured to determine a first angular position of the probe tip relative to the probe base.

4. The remote unit of claim 3, wherein at least one of the encoders is configured to determine a second angular position of the probe tip relative to the probe base.

5. The remote unit of claim 2, wherein at least one of the encoders is configured to determine an axial position of the probe tip relative to the probe base.

6. The remote unit of claim 2, further comprising a trigger configured to effect one or more measurements associated with a location touched by the probe tip.

7. The remote unit of claim 2, further comprising a touch sensor associated with the probe tip, wherein one or more measurements associated with a location is taken when the touch sensor comes into contact with the location.

8. A remote unit of a multi-dimensional measuring system comprising:
    a target in line of site communication with a tracking unit of the multi-dimensional measuring system, the target being capable of making pitch, yaw, and roll movements;
    a probe assembly coupled to the target, the probe assembly comprising a probe tip, a probe stem, and a probe base, wherein the probe tip is configured to reach locations not within the line of sight between the tracking unit and the target; and
    a trigger configured to effect one or more measurements associated with a location touched by the probe tip.

9. The remote unit of claim 8, further comprising one or more encoders coupled to the probe assembly.

10. The remote unit of claim 9, wherein at least one of the encoders is configured to determine a first angular position of the probe tip relative to the probe base.

11. The remote unit of claim 10, wherein at least one of the encoders is configured to determine a second angular position of the probe tip relative to the probe base.

12. The remote unit of claim 9, wherein at least one of the encoders is configured to determine an axial position of the probe tip relative to the probe base.

13. The remote unit of claim 8, further comprising a touch sensor associated with the probe tip, wherein one or more measurements associated with a location is taken when the touch sensor comes into contact with the location.

14. The remote unit of claim 8, wherein the probe stem is configured to pivot about the probe base along a circle.

15. The remote unit of claim 8, wherein the probe stem is configured to move about two axes.

16. The remote unit of claim 8, wherein the probe stem is configured to pivot in thee dimensions about the base.

17. The remote unit of claim 8, wherein the probe stem is configured in an L-shape.

18. The remote unit of claim 8, wherein the probe stem is configured to telescope, such that a length of the probe stem is variable.

* * * * *